Jan. 27, 1942. M. F. A. JULIEN 2,271,016
ANTIVIBRATING RESILIENT SUPPORT
Filed Nov. 23, 1938 3 Sheets-Sheet 1
FIG. 1
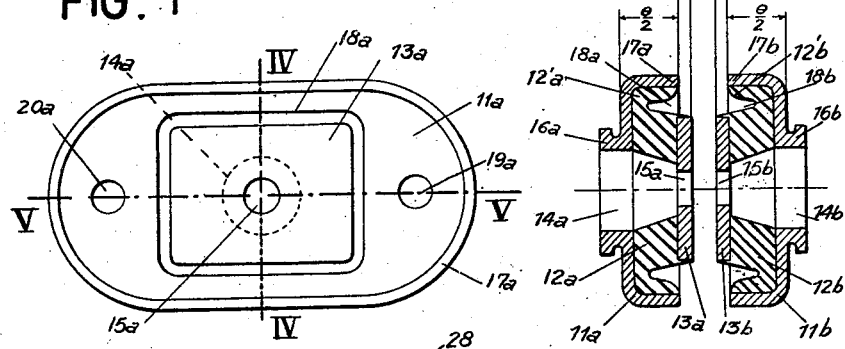
FIG. 2
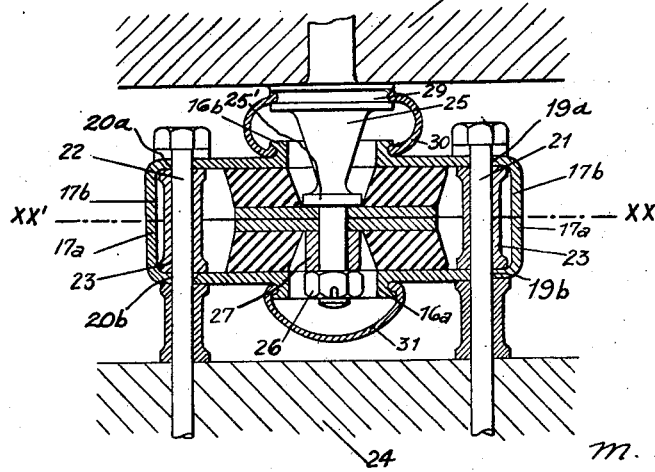
FIG. 3
M. F. A. Julien,
Inventor
By: Glascock Downing & Seebold
Attys.

Jan. 27, 1942. M. F. A. JULIEN 2,271,016
ANTIVIBRATING RESILIENT SUPPORT
Filed Nov. 23, 1938 3 Sheets-Sheet 2

M. E. A. Julien, Inventor
By: Glascock Downing & Seebold Attys.

Jan. 27, 1942.  M. F. A. JULIEN  2,271,016
ANTIVIBRATING RESILIENT SUPPORT
Filed Nov. 23, 1938  3 Sheets-Sheet 3

M. F. A. Julien
Inventor
By: Glascock Downing & Seebold
Attys.

Patented Jan. 27, 1942

2,271,016

UNITED STATES PATENT OFFICE 2,271,016

ANTIVIBRATING RESILIENT SUPPORT

Maurice François Alexandre Julien, Paris, France

Application November 23, 1938, Serial No. 242,071
In France November 23, 1937

7 Claims. (Cl. 248—9)

The present invention relates to an improvement in the construction of anti-vibrating resilient supports such as those which are used for connecting a vibrating engine or body to any fixed or movable structure or frame in order to protect the said structure from the harmful effects of vibrations which have their seat in the said vibrating engine or body. The invention relates more particularly to resilient supports of the kind constructed with the aid of metal or other rigid parts some of which are rigid with the vibrating engine or body, the others with the frame, and the opposite faces of which are separated or connected together by layers of rubber or similar material adhering to the said faces by moulding, vulcanisation or any other process.

The improvement according to the invention is mainly characterised in that the said supports are constructed of two assembled parts each comprising an outer frame and an inner half frame, the outer frames forming casings having bent down and joined edges, a peripheral play being provided between the intermediate half frames and the said bent down edges and a space in the form of a groove being provided in the resilient material over the whole periphery of the inner frame.

This type of construction avoids the known disadvantages of this type of resilient supports and it renders them tight and impenetrable by air and liquids, invariable as regards dimensions and figures of moulding, and in addition it enables their mechanical strength to be increased.

Other features of the invention and its applications will be indicated in the course of the description of the accompanying drawings which show embodiments of supports according to the invention given by way of example only.

In the said drawings:

Figure 1 shows an internal plan view of a half support according to the invention.

Figure 2 shows a transverse section (made along the line IV—IV of Figure 1) with two half supports separated.

Figure 3 shows a longitudinal section (made along the line V—V of Figure 1) of a support in two completely assembled parts.

Figure 7:
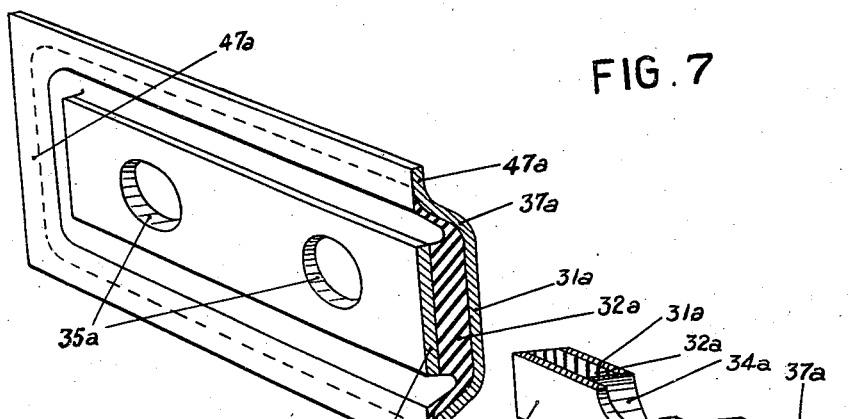
Figure 7 is a perspective view in section, and broken away, of an extended half support in the form of a beam having multiple fixing points.

In French patent specification No. 798,631 filed on November 28, 1935, a resilient support comprising external and parallel metal plates is described, which can be rigidly fixed at their ends to a frame structure. The said plates are connected by two layers of resilient material to an inner metal plate the central part of which is accessible through suitable openings provided in the external plates and in the resilient material. The plates can be rigidly fixed to a vibrating engine or body.

Supports of this type, the efficacy of which has been proved, have nevertheless a certain number of disadvantages which will now be explained.

In the first place, the resilient material over the whole of its free edge is unprotected from the action of the air and sun and from water, oil, and combustible or other liquid or gaseous products, coming from the vibrating engines or bodies fixed on the said supports. This results in a more or less rapid deterioration of the resilient material of the said supports, or at least a considerable limitation in the initial choice of materials to be used.

In the second place, the said supports being generally manufactured by moulding at a relatively high temperature and with resilient materials, such as rubber, of which the coefficients of contraction after heating and the thermal coefficients of expansion vary with the compositions of the mixtures used, much difficulty is experienced in obtaining a sufficient exactitude in the thickness between the external and parallel plates, which is required in numerous applications of the support where precise mounting is essential. Even if this thickness is obtained by careful manufacture, it is still subject to variation after a period of time on account of the strain of the rubber and its compression under applied forces.

Finally, but as an accessory, the structure of parallel plates obtained lacks rigidity to bending for all the normal forces, perpendicular to the plane of the plates which very often necessitates the use of supports only in the interior of sheaths or casings, which themselves have a sufficient rigidity under the action of the forces in question.

As has already been stated it is proposed in the invention to overcome these disadvantages of simply constructed resilient supports.

Figures 1 to 3 show one embodiment of the invention. It is seen that the resilient support consists of two separate parts or halves (Figure 2) each comprising a central plate 13a, 13b connected by a layer of resilient material 12a, 12b to the inner plane face of a casing 11a, 11b, the edges 17a, 17b of which are bent up over the whole periphery and bear against one another symmetrically and tightly together when assembled.

It is also seen that the inner plates 13a, 13b have or are permitted considerable play within the casings, a hollow space being provided for this purpose. This ensures for the plates 13a, 13b play in all directions of their planes and a great freedom of movement due to the space between the said plates and the edges 17a, 17b of the casings. This hollow space is due to the presence of deep grooves 18a, 18b formed by moulding in the mass of rubber and which occupies all the available space excepting a layer of rubber 12'a, 12'b which is in contact with the casing. This layer corresponds to the play which the constructing mould must allow to enable the excess resilient material used in the construction of the support to escape through the edges of the casing before vulcanisation.

If necessary, the space in question could be provided on one part only of the periphery if, for example, it is desired to have a rigidity in a certain direction.

The mounting of the two half supports is shown in Figure 3 and is obtained in the following manner:—

1. Through holes 19a, 19b, 20a, 20b provided in each of the casings on both sides of the central plate 13a, 13b pass bolts 21, 22 supported, for example, by inner bracing members 23, the tightening of which bolts enables the complete support to be made rigid with the vibrating body or engine 24 to be isolated.

The tightening of the bolts 21, 22 ensures the hermetic closure of the supports, the edges 17a, 17b of the casings coming into intimate contact over the whole periphery in the plane of symmetry XX' of the support. If necessary, the tightness at the said joining plane can be improved with the aid of known means such as plastic joints, drying materials, etc. On the other hand, it can be seen that owing to the perfect abutment of the two half casings at their joining plane the total thickness of the support is henceforth invariable and equal to the sum of the half casings, namely ½e+½e=e, whatever may be the relative position of the central plates 13a, 13b. In particular, supposing as shown in Figure 2 that the said plates project through a distance ε on the joining plane before mounting, complete closure of the support on mounting will result in the layer of resilient material 12a, 12b of each half support being subjected to a deformation of crushing or of compression equal to ε: and this also constitutes an essential feature of the invention.

2. Through the openings 14a, 14b provided in the casings 11a, 11b the inner plates 13a, 13b can be fixed in any known manner on a bolt 25 having a shoulder 25', by their central holes 15a, 15b owing to tightening of the nut 26 on the bracing member 27 which locks the said plates on the shoulder of the bolt 25, the bolt being rigid with the frame or support 28. If desired the fixing means can be reversed and the bolt 25 can be made rigid with the vibrating body or engine 24 and the bolts 21, 22 as well as the support itself can be made rigid with the frame 28 according to the convenience of installation.

3. Finally, to ensure the tightness of the annular space between the fixing bolt 25 and the apertures 14a, 14b (Figure 2) there are provided covers 30, 31 of suitable flexible or elastic material, which material will be specially chosen according to circumstances. The said flexible covers are provided with flanges which press tightly into grooves, such as 16a, 16b, on the periphery of the opening of the casings and also press into a groove 29 provided on a shoulder of the bolt 25.

As will be readily understood, the supports have from the point of view of the rigidity, under the action of forces normal to the plane of the plates 13a, 13b, an unquestionable superiority over supports such as have been previously described, on account of the replacement of the outer plates by casings 12a, 12b provided with bent over edges 17a, 17b.

Figure 5:
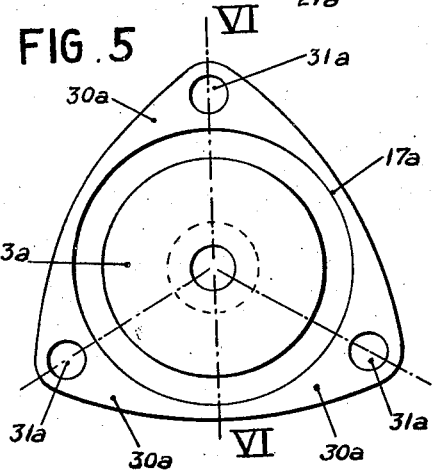
Figure 5 is an internal plan view of a part of the support of Figure 4.
Figure 4:
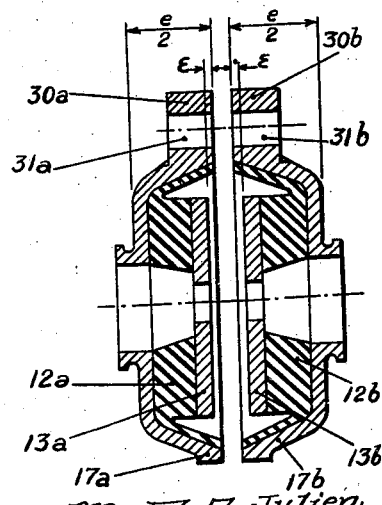
Figure 4 is a modification in transverse section (along line VI—VI of Figure 5) of a support in two parts before assembly.

This specific feature of the invention is shown to an even more accentuated degree in a second construction which is shown in Figures 4 and 5. The essential features already pointed out are present the only differences being in the form of the support, and to the method of fixing the casings by turned down edges 17a, 17b which are provided with bosses 30a, 30b drilled with holes 31a, 31b for receiving assembly bolts. The two half casings thus secured at a number of points are equivalent from the point of view of resistance to bending to a hollow body of great rigidity.

It will be noticed that in the case of Figure 4 the central plates 13a, 13b have been shown contracted by a distance ε relative to the common joining plane of the casings. As a result said plates will be spaced from one another on assembly by the distance 2ε. However, when they are fixed and locked in contact with one another, for example by means of a bolt such as 25 (Figure 3), the layer of resilient material 12a, 12b of each half support will be subjected to a deformation of tension equal to ε and the latter thus constitutes a further improvement.

Figure 6:
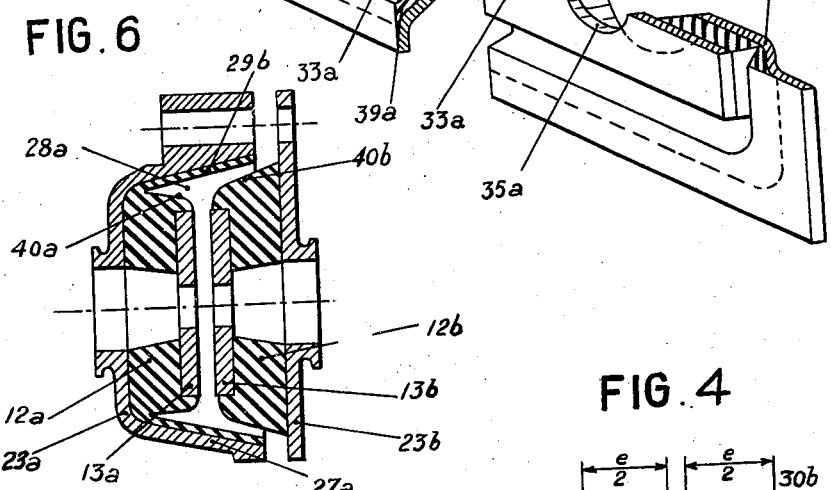
Figure 6 is a section of a modification of Figure 4.

Figure 6 shows a modification of the same type of support as Figure 5. Here the joining plane of the casings has been displaced relatively to the plane of symmetry of the support. In fact, only one of the half casings 23a is provided with a bent over edge 27a the other casing 23b being reduced to a simple plate. However, the conditions of mounting and the features of operation remain as in the previous construction.

In this latter case, however, the groove 28a has a specific profile as will be seen owing to the inward curve of the free surface of the resilient material 40a, 40b on the periphery of the inner plates 13a, 13b. The said profile is intended to increase progressively the resistance opposed to the transverse movement of the plates 13a, 13b in proportion as they approach the edges 27a of the casing 23a, progressive contact being effected between the two surfaces of resilient material 40a, 40b and 29b. The latter point likewise constitutes a feature of importance.

A further application of the invention is shown in the modified construction illustrated in Figures 7 to 10.

The support is here of rectangular form which is very much elongated in one direction and in use resembles a resilient beam. Each half beam (Figures 7 and 10) comprises a casing 31a, 31b constructed, for example, of stamped metal sheet, connected by a layer of adhering resilient material 32a, 32b to a central sheet metal plate 33a, 33b.

The edges 41a, 41b of the casings 31a, 31b are turned down on the periphery of the support and on assembly abut against one another tightly either along their edges or as shown along a bent over flange 41a, 41b.

As in all the preceding embodiments a considerable peripheral play is allowed between the central parts 33a, 33b and the curved edges of the casings 31a, 31b. In the same way a gap is provided in the said space by forming in the resilient material an uninterrupted groove 38a, 38b, the edges of which can be rectilinear or inwardly curved (as in the embodiment shown in Figure 6) and which leaves a thin layer of resilient material 39a, 39b in contact with the casing.

Figure 8:
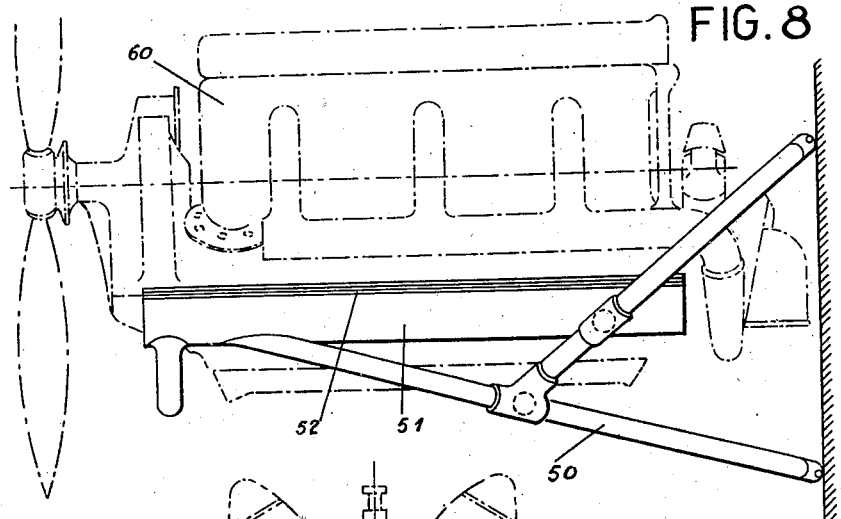
Figure 8 is a longitudinal view of an aviation engine assembly having cylinders in line mounted on its frame by means of resilient supports shown in Figure 7 which are rigid with the side members of the frame.
Figure 9:
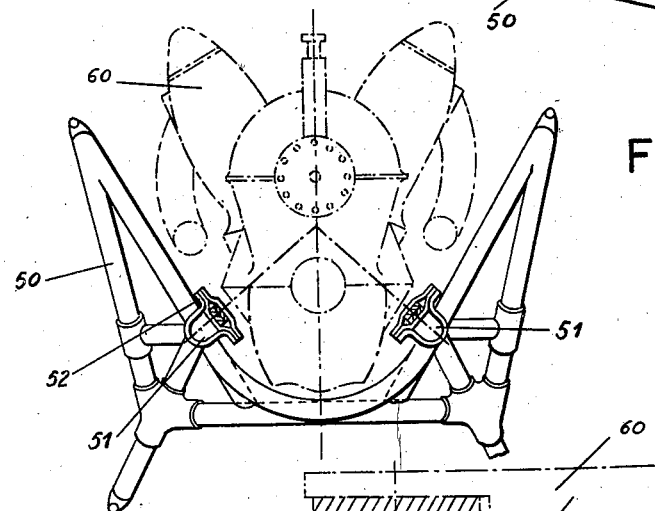
Figure 9 is an end view of the engine assembly of Figure 8 with the supports shown in transverse section.
Figure 10:
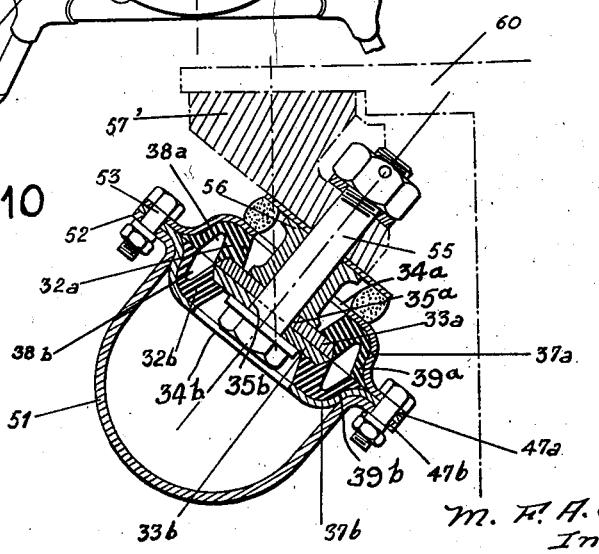
Figure 10 is a transverse section on a larger scale of a support shown in position as in Figures 8 and 9.

The advantage of this type of support is that on account of its great elongation it enables a continuous longitudinal fixing to be obtained which is particularly adapted to automobile or aviation engines arranged in line. As shown in Figures 8, 9 and 10, for example, the engine 60 (or vibrating body) can be connected to the inner plates 33a, 33b by a plurality of bolts such as 55 which pass through the holes 35a, 35b of the said plates and secure them on the bracing members 56 which are themselves locked on a part 57' secured to the engine 60.

Access to this fixing means and to the central plates 33a, 33b is obtained as previously by means of opening 34a, 34b in the casings 31a, 31b and the lining of resilient material 32a, 32b.

The tightness of the said openings can be obtained either according to the process described and shown in Figure 3 or as indicated in Figure 10 by the use of compressible and tight washers (soft rubber, felt, etc.).

The casings 31a, 31b are secured to the frame at their sides and it is very advantageous to make use of the natural rigidity of the resilient beam to render the said frame rigid.

Thus, for example, the side members 51 of the frame 50 which support the engine are initially obtained in the form of an open U but as they receive the resilient beam the said U's are closed on account of the fact that the flanges of the casings 41a, 41b are assembled by bolts 53 or rivets on the flanges 52 of the side member 51. The assembly of the resilient beam and the side member thus constructed is equivalent to a tube or hollow body of great resistance to torsion and bending.

This reinforcement of an open side member by the addition of a resilient support having jointed casings likewise constitutes one of the features of the invention.

It follows that the elongated support which has just been described can also be mounted in a different manner, that is to say for example by making the outer casings rigid with the engine or vibrating body and the inner plates rigid with the frame.

I claim:
1. A resilient support of the kind described consisting of two outer members adapted to be assembled together to form enclosing means, each member comprising an outer frame having a substantially flat central portion and a substantially flat inner frame bonded thereto by a layer of elastic material, one at least of said outer frames having bent over edges, complementary contact surfaces on said outer frames forming a peripheral closure of said enclosing means a space in the elastic material at the periphery of the inner frames, said space having a triangular cross-section with a straight base situated at the outer surface of the elastic material.

2. A resilient support of the kind described consisting of two outer members adapted to be assembled together to form enclosing means, each member comprising an outer frame having a substantially flat central portion and a substantially flat inner frame bonded thereto by a layer of elastic material, one at least of said outer frames having bent over edges, complementary contact surfaces on said outer frames forming a peripheral closure of said enclosing means a space in the elastic material at the periphery of the inner frames, said space having a triangular cross-section with a straight base situated at the outer surface of the elastic material, one side of said triangle being inwardly curved and remotely situated with respect to the periphery of the inner frames.

3. A resilient support of the kind described consisting of two outer members adapted to be assembled together to form enclosing means, each member comprising an outer frame having a substantially flat central portion and a substantially flat inner frame bonded thereto by a layer of elastic material, one at least of said outer frames having bent over edges, complementary contact surfaces on said outer frames, forming a peripheral closure of said enclosing means a space in the elastic material at the periphery of the inner frames, the outer frames each having axial openings and flexible means surrounding said openings.

4. A resilient support of the kind described consisting of two outer members adapted to be assembled together to form enclosing means, each member comprising an outer frame having a substantially flat central portion and a substantially flat inner frame bonded thereto by a layer of elastic material, one at least of said outer frames having bent over edges, complementary contact surfaces on said outer frames, forming a peripheral closure of said enclosing means a space in the elastic material at the periphery of the inner frames, the outer frames each having axial openings and flexible means surrounding said openings, said flexible means engaging in grooves provided in said outer frames.

5. A resilient support consisting of two outer members adapted to be assembled together to form enclosing means, each member comprising an outer frame having a substantially flat central portion and complementary contact surfaces forming a peripheral closure of said enclosing means a substantially flat inner frame bonded to said outer frame by a layer of elastic material, said outer and inner frames having a length greater than the width and forming a beam-like structure, one at least of said outer frames having bent over edges, and a space in the elastic material at the periphery of the inner frames.

6. A resilient support consisting of two outer members adapted to be assembled together to form enclosing means, each member comprising an outer frame having a substantially flat central portion and complementary contact surfaces forming a peripheral closure of said enclosing means, a substantially flat inner frame bonded to said outer frame by a layer of elastic material, said outer and inner frames having a length greater than the width and forming a beam-like structure, a space in the elastic material at the periphery of the inner frames and a member of U-form rigid with the outer frame members and forming a tube or hollow body adapted to resist torsion or bending.

7. An engine suspension means comprising two outer members adapted to be assembled together to form enclosing means, each member comprising an outer frame having complementary contact surfaces forming a peripheral closure of said enclosing means, a substantially flat inner frame bonded to said outer frame by a layer of elastic material, said outer frame having a length greater than the width and forming a beam-like structure, a member of U-form rigid with the outer members, means connecting the inner frame members to an engine and means connecting said member of U-form with a supporting frame.

MAURICE FRANÇOIS ALEXANDRE JULIEN.